(12) United States Patent
Kalia et al.

(10) Patent No.: US 9,170,993 B2
(45) Date of Patent: Oct. 27, 2015

(54) IDENTIFYING TASKS AND COMMITMENTS USING NATURAL LANGUAGE PROCESSING AND MACHINE LEARNING

(71) Applicant: Hewlett-Packard Development Company, L.P., Houston, TX (US)

(72) Inventors: Anup Kumar Kalia, Raleigh, NC (US); Hamid Reza Motahari Nezhad, Los Altos, CA (US); Claudio Bartolini, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 13/753,022

(22) Filed: Jan. 29, 2013

(65) Prior Publication Data

US 2014/0214404 A1 Jul. 31, 2014

(51) Int. Cl.
  *G06F 17/27* (2006.01)
  *G06F 17/20* (2006.01)
  *G06F 17/21* (2006.01)
  *G06F 17/28* (2006.01)
(52) U.S. Cl.
  CPC ...................................... *G06F 17/28* (2013.01)
(58) Field of Classification Search
  CPC ....................................................... G06F 17/02
  USPC ........................... 704/1, 9, 10, 257, 270–275
  See application file for complete search history.

(56) References Cited

U.S. PATENT DOCUMENTS

| | | | |
|---|---|---|---|
| 7,680,888 | B1 | 3/2010 | Marmaros et al. |
| 8,108,206 | B2 | 1/2012 | Hufnagel et al. |
| 2009/0235280 | A1* | 9/2009 | Tannier et al. ................ 719/318 |
| 2009/0306981 | A1 | 12/2009 | Cromack et al. |
| 2010/0169309 | A1* | 7/2010 | Barrett et al. .................. 707/736 |
| 2012/0245925 | A1* | 9/2012 | Guha et al. ........................ 704/9 |
| 2012/0245944 | A1 | 9/2012 | Gruber et al. |
| 2012/0324531 | A1 | 12/2012 | Bhamidipaty et al. |

OTHER PUBLICATIONS

Ghosh, Sucheta., "End-to-End Discourse Parse using Cascaded Structured Prediction," University of Trento—Italy, Department of Information Engineering and Computer Science, Apr. 2012, 141 pages.

* cited by examiner

*Primary Examiner* — Jesse Pullias
(74) *Attorney, Agent, or Firm* — Brooks, Cameron & Huebsch, PLLC (57) ABSTRACT

An example of identifying tasks and commitments can include receiving a communication message. A task and a parameter can be identified in the communication message. Information related to the task can be extracted from the communication message using natural language processing (NLP) and machine learning (ML). A commitment related to the task can be identified using NLP extracted information. A state of the commitment can be identified using NLP and ML based on the extracted information.

15 Claims, 6 Drawing Sheets

IDENTIFYING TASKS AND COMMITMENTS USING NATURAL LANGUAGE PROCESSING AND MACHINE LEARNING

BACKGROUND

An employee can form a team with other employees to perform tasks. An employee may be responsible to input these tasks into an application and update the progress of the task manually. A task may be a business activity that can be either pre-defined (e.g., part of a best practice process) or created spontaneously by people (e.g., through electronic mail, chat, phone, memoranda, etc.). Updating such a system may be cumbersome and time-consuming and may be overlooked.

DETAILED DESCRIPTION

An entity can have a person and/or a group of people (e.g., business people, sales people, employees, etc.) to carry out a task and/or tasks for the entity. A management team for business people can request a report from the business people regarding generated customer leads, the status of those leads, and whether a deal with the customer has been closed. Keeping track of concurrent action items can assist in monitoring multiple tasks. Distinguishing between different types of tasks and various priorities can assist in carrying out tasks.

Performance of a task can be requested through email, online chat conversations, or verbally by telephone or in person. Tasks can be assigned, delegated, revised, canceled, completed, etc., and these changes can be monitored and updated throughout a lifecycle of the task. For example, a first business person can send a second business person an email designating an update to a task (e.g., that a task has been performed). Unless the first and/or second business person manually updates the progress of the task, the task status can remain unknown or inaccurate.

Communication related to tasks can contain information used to identify particular parameters of a task and/or identify if a task signals a commitment. Keywords can signify a relationship conveyed in communication between a first person and a second person. For example, the first person can communicate to the second person that the second person is being given a task (e.g., to complete an assignment).

As described herein, communication (e.g., a message) can be classified into five different classes: commissives, directives, representatives, expressives, and declarations. These different classes can be classified according to Speech Act theory. A message can be classified as a commissive if a sender of the message promises to take an action in the future. A message can be classified as a directive when the sender intends a receiver of the message to do something. A message can be classified as representative when the sender commits to truthfulness of the message. A message can be classified as expressive when the message expresses the sender's psychological state. A message can be classified as a declaration when the sender of the message brings about a change in status of the referred to object or objects.

Embodiments of the present disclosure can include multiple network devices, systems, including executable instructions and/or logic thereon, and methods for identifying tasks and commitments. A network device can include a processing resource and/or logic coupled to a memory. The memory can include program instructions executable by the processing resource to receive a communication message, identify a task and a parameter of the task in the communication message, extract information related to the task from the communication message using natural language processing (NLP) and machine learning (ML), and identify a commitment using NLP extracted information and a state of the commitment using NLP and ML based on the extracted information.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

As used herein, "a number of" an element and/or feature can refer to one or more of such elements and/or features. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
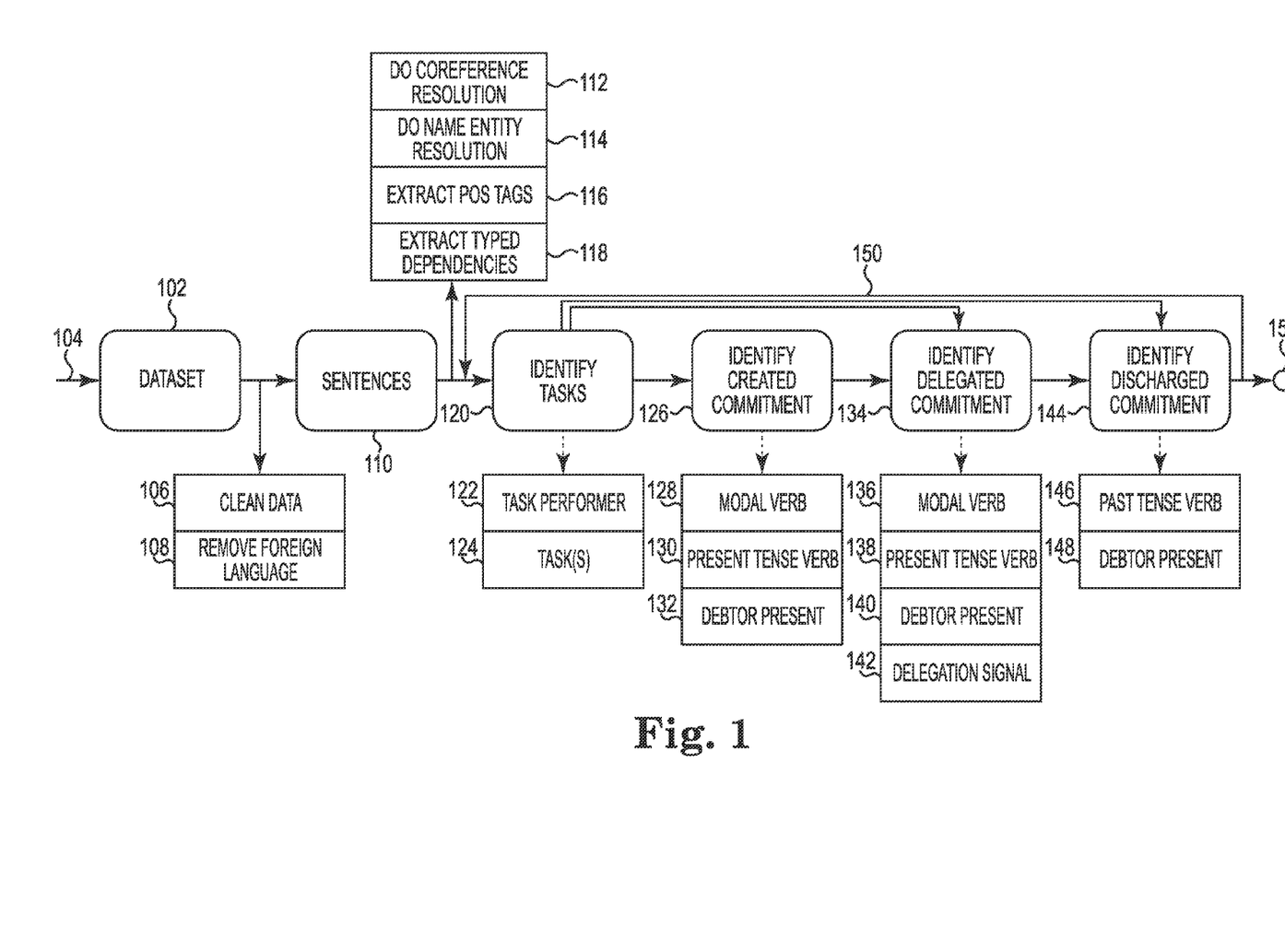
FIG. 1 illustrates a flowchart of an example of a system for identifying tasks and commitments according to the present disclosure.

FIG. 1 illustrates a flowchart of an example of a system for identifying tasks and commitments according to the present disclosure. As indicated in FIG. 1, a dataset 102 (e.g., conversations from an information technology (IT) setting, including email, chats, texts, phone conversations, etc.) can be received from a user via a communication link 104. Communication links, as used herein, can include network connections, such as logical and/or physical connections. Preprocessing of the dataset 102 can include cleaning the data 106. For example, inaccurate data (e.g., corrupt, incorrect, irrelevant, etc.) can be corrected (e.g., replaced, modified, deleted, etc.). Preprocessing of the dataset can include removing foreign language words and/or sentences 108.

Sentences 110 extracted from the dataset 102 can have a number of features extracted from the sentences. Co-reference resolution 112 can be performed on the sentences 110. Co-reference resolution 112 can relate a name with a personal pronoun. For example, in the pair of sentences, "Please add Jim Curry to your list. He should be part of the due diligence team," the co-reference resolution helps to relate "Jim Curry" (name) with "He" (personal pronoun). A name entity resolution (NER) 114 can be performed on the sentences 110. An NER 114 can be considered in a process to identify a noun and whether the noun is a person or an organization.

The sentences 110 can have part-of-speech (POS) tags extracted 116 from the sentences. POS tagging can include marking up a word in a text as corresponding to a particular part of speech based on the word's definition as well as context (i.e., relationship with adjacent and related words in a phrase, sentence, paragraph, etc.). A POS tag can identify a type of personal pronoun which can indicate a subject in a task and/or identify a debtor of a commitment. A POS tag can identify a state of the verb associated with the subject so as to identify a state of the commitment. For example, a present tense of the verb can indicate that the commitment is either a commissive or a directive whereas a past tense can indicate a commitment is discharged. By way of example and not by way of limitation, POS tags can include NN for nouns, NNP for pronouns, PRP for personal pronouns, VB for present tense verbs, VBD for past tense verbs, VBZ for a third person singular verb, VBN for a past participle, and VBP for a non-third person singular, among others.

The sentences 110 can have typed dependencies extracted 118 from the sentences. A typed dependency can relate words in a sentence and can give a clue as to the sentence's logical structure. By way of example and not by way of limitation, a relation can be an "nsubj," "aux," and "advmod," among others. "Nsubj" can designate a dependency tag of a nominal subject. An "aux" can designate an auxiliary dependency tag. An "advmod" can be an adverb modifier dependency tag.

A dependency can be defined as a triplet of a governor, a dependent, and a relation between the governor and the dependent. For example, in the sentence, "Lorraine, I will be in a meeting during this time," there is an "nsubj" relation in which "I" is the dependent and "be" is the governor. This relation suggests, for example, that the subject in the sentence is "I" and his action is "be."

Figure 2A:
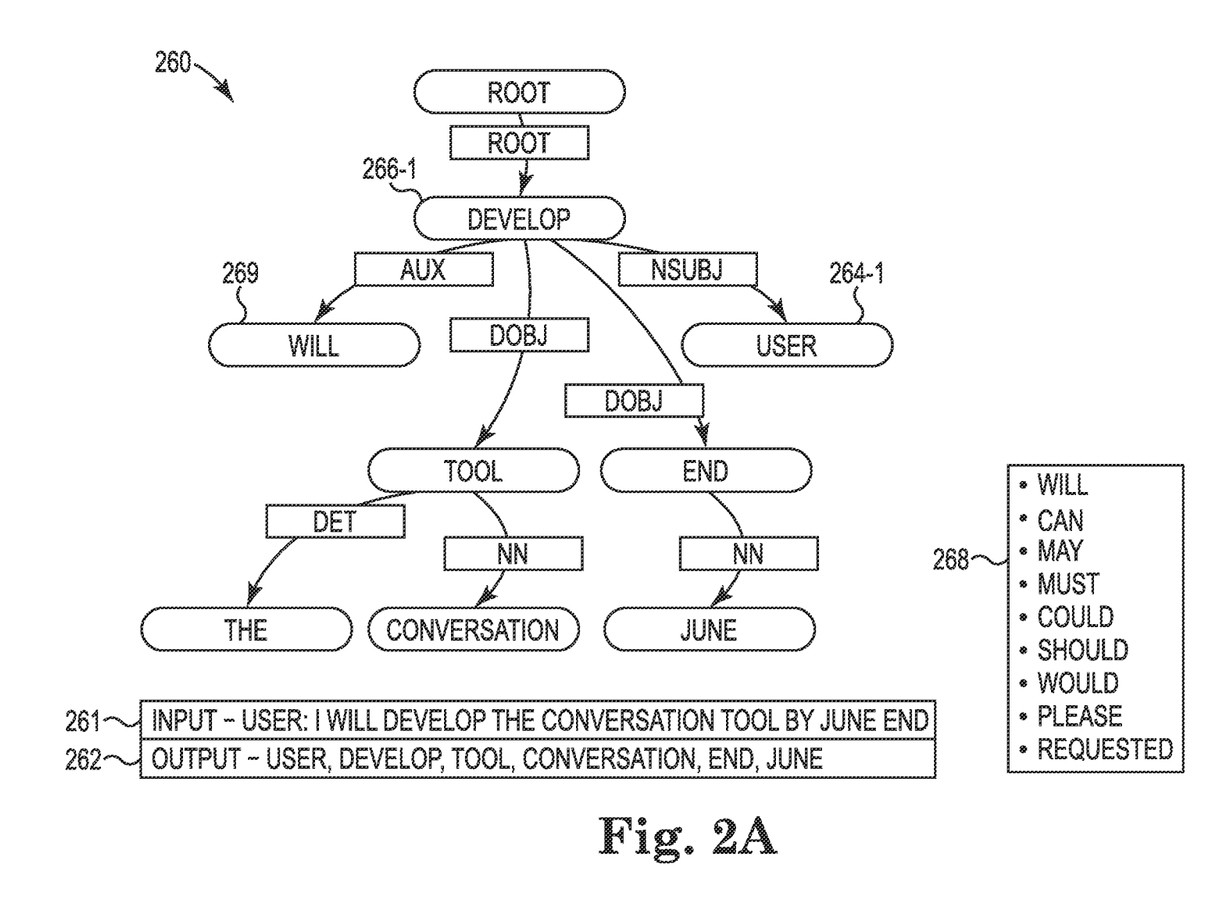
FIGS. 2A-2B illustrate examples of block diagrams of identifying commitments according to the present disclosure.
Figure 2B:
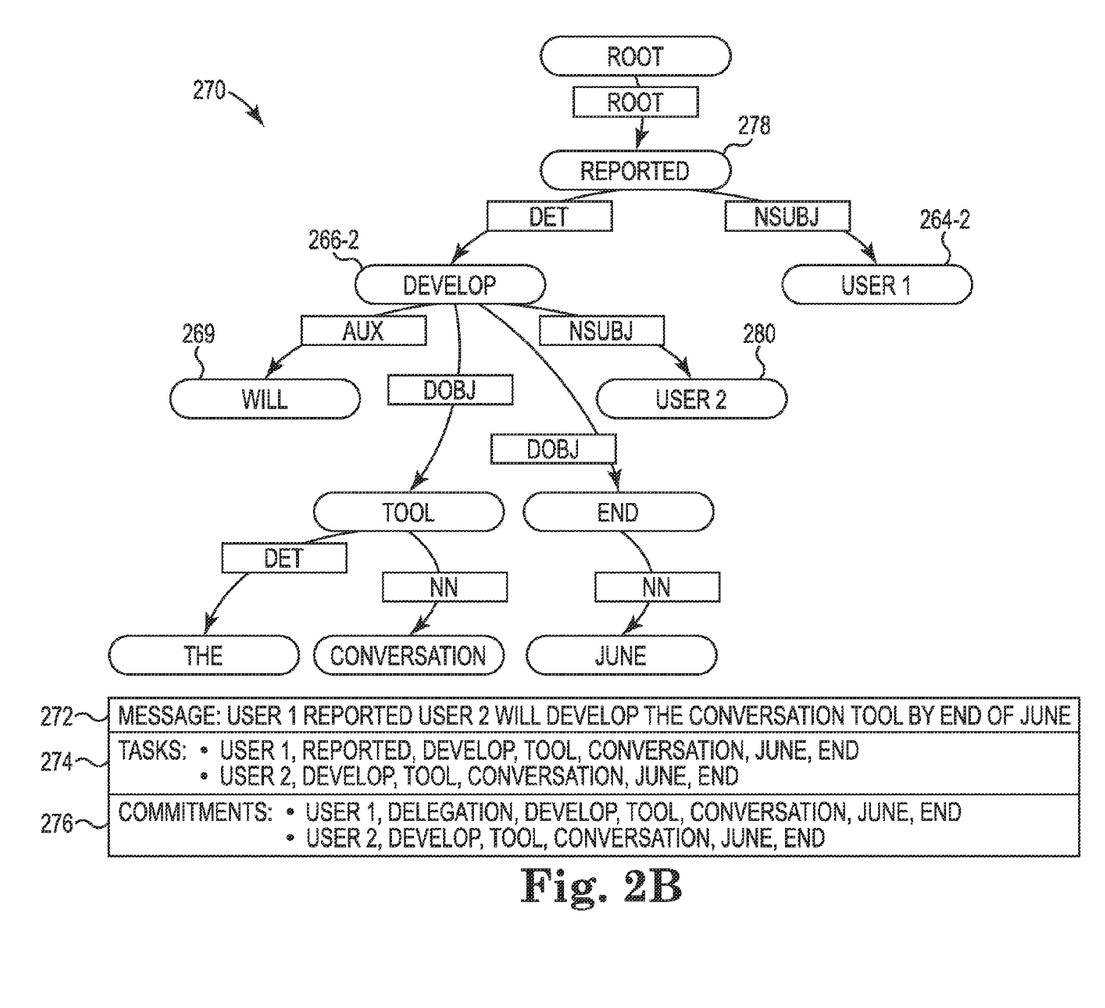
Figure 3:
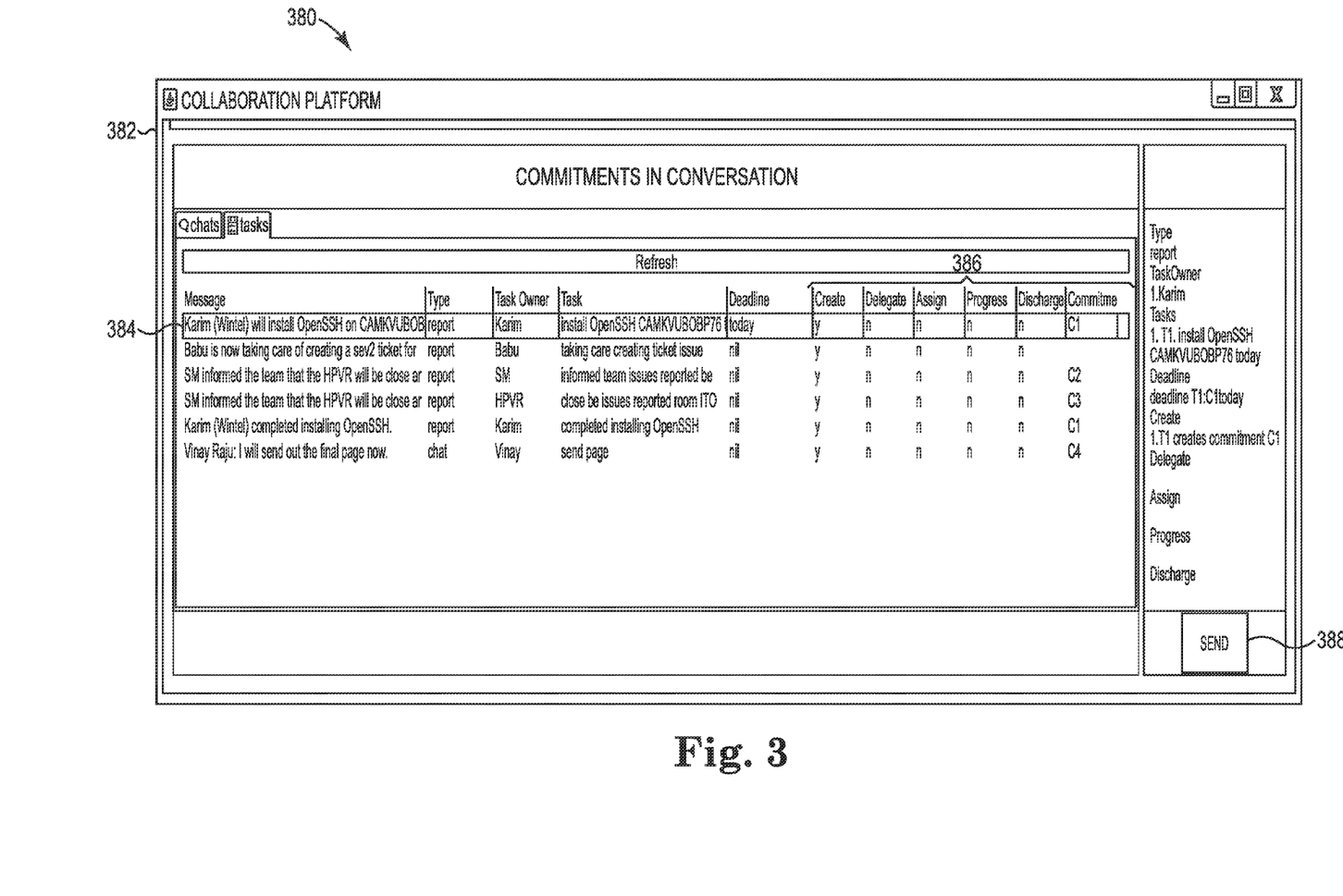
FIG. 3 illustrates an example of a display of identified commitments according to the present disclosure.

A task can be identified 120 by extracting features (e.g., co-reference resolution 112, NER 114, POS tags 116, and typed dependencies 118) from a sentence 110. A number of processes can be used to extract such features (e.g., see Example Process 1 below). A typed dependency array can be formed from extracted features to identify a task 120. Examples of typed dependency arrays are shown in FIGS. 2 and 3 below. A typed dependency array can be defined as an array that consists of relations derived from a sentence using a typed dependency method. An "nsubject" relation can be considered to determine if a dependent and a governor in the relation are a "valid subject" and a "valid verb," respectively, in order to identify a task 120.

A dependent can be considered a valid subject if the POS tag associated with the dependent is an NNP or an NER resolves the subject as a person or an organization. A governor can be considered a valid verb when the POS tag associated with the governor is VB, VBD, VBP, VBZ, and/or VBN and when the governor is an action verb. An action verb can be a verb that expresses an action and/or designates doing something.

Verifying an action verb can eliminate words that are verbs and do not express actions. When the governor and the dependent are valid, the dependent can be stored as a subject (e.g., task performer 122) and the governor as an action for the subject (e.g., one or more tasks 124). Action details can be extracted by using an action verb to find its dependencies in an array of triplets by looking for nouns and/or verbs associated with the action verb. The following Example Process 1 is an example of a process to extract a subject, an object, and an action from a sentence in a communication.

Example Process 1

```
1    typed dependency array ← get typed dependencies (sentence);
2    foreach nsubj ∈ typed dependency array do
3    |    if get POS(dependent ∈ nsubj) = PRP first person then
```

-continued

```
4    |    |    subject ← sender of the email;
5    |    |    object ← receiver of the email;
6    |    else
7    |    |    if get POS(dependent ∈ nsubj) = PRP second person
     |    |    then
8    |    |    |    subject ← receiver of the email;
9    |    |    |    object ← sender of the email;
10   |    else
11   |    |    if get POS(dependent ∈ nsubj) = PRP third person
     |    |    then
12   |    |    |    subject ← dependent;
13   |    |    |    object ← extractObject(sentence);
14   |    if valid subject(dependent) ∧ valid verb(governor) then
15   |    |    action ← extract action details(governor);
```

In this example process, when a POS tag associated with the dependent is PSP first person (e.g., I, we), a subject can be a sender of the email (e.g, a creditor). For an instance of an online chat conversation (e.g., a chatroom, a chat box, instant messenger, etc.), a subject can be an initiator of the online chat. When a POS tag associated with a dependent is a PRP second person (e.g., you), the receiver of a communication can be the subject of a task. When a POS tag associated with a dependent is a PRP third person, an approach for both emails and chats can be the same. When a POS tag associated with a dependent is personal PRP (e.g., he, she, they), a co-reference resolution can resolve a subject.

An identified task 124 can be analyzed to identify a created commitment 126 for the task 124. Identifying the creation of such a commitment 126 can include checking whether an action in the identified task 124 has a relationship with a modal verb 128 and for example, the word "please." A modal verb can be a word that expresses possibility, likelihood, obligation, etc. (e.g., will, shall, can, could, would, should, may, might, must, etc.). When a verb has a relation with words indicating a request and/or delegation (e.g., the modal verb and/or "please"), a task can be identified as including a created commitment.

When a task indicates a commitment creation, the subject of the task can be stored as a debtor being present 132, the object of the task can be designated as a creditor, and an action in the sentence can be designated as a consequent of the commitment. A consequent is an action(s) that the debtor is committed to bringing about for the creditor. When an action verb is in the present tense (VB) 130 and has a relationship with a modal verb 128, a task can be considered as creating a commitment.

Commitments can be created in a number of ways. For example, commitments can be created as commissives and as directives. When an action verb in a sentence follows a modal verb, a commitment in the sentence can be designated as commissive. When a second person personal pronoun (e.g., you) in a sentence follows a modal verb and/or an action verb following the word "please," for example, a commitment in the sentence can be designated as directive. The following Example Process 2 is an example of a process for identifying created commitments:

Example Process 2

```
1    T1 ← extract task (sentence);
2    Commitment ← False ;
3    If getPOS(action verb ∈ T1) = VB then
4    |    foreach relation ∈ typed dependency array do
```

-continued

```
5    |  |   if (dependent ∈ relation = action) ∧ (governor ∈ relation = (modal
               verb v please)) then
6    |  |  |   commitment ← True ;
7    |  |   else
8    |  |  |   if (governor ∈ relation is action) ∧ (dependent ∈ relation
                is (modal verb v please)) then
9    |  |  |  |   commitment ← True ;
```

When a creation of a commitment is identified 126, a delegated commitment can be identified 134. While a delegated commitment can be identified 134 after a creation of a commitment is identified 126, a delegated commitment can be identified 134 following an identification of a task 126. That is, identifying a delegated commitment 134 does not necessitate prior identification of a created commitment 126.

As stated previously for identifying a created commitment, identifying a delegated commitment 134 can include identifying a modal verb 136, a present tense verb 138, and a debtor present 140. In addition, identifying delegation of a commitment can include identifying a delegation signal 142.

A commitment can be associated with a debtor and a creditor. A debtor can be someone who is responsible for completion of a task. A creditor can be someone who has requested that the task be completed by the debtor. A debtor can also offer to perform a task for a creditor. There can be at least two different kinds of delegation. An example of a delegation of a commitment can include a previous creditor that is unknown to a new debtor. For example, a first employee (first creditor) can request that a task be performed by a second employee (first debtor). Then, the second employee (first debtor) can become a second creditor by delegating the task to a third employee (second debtor). The first employee (the first creditor) does not know about the third employee (the second debtor).

Another example of a delegation of a commitment can include a previous creditor that is known to a new debtor (e.g., second debtor). For example, a first employee (first creditor) can request that a task be performed by a second employee (first debtor). In addition, the first employee can request the task be performed by a third employee (second debtor).

Identifying a delegation of a commitment associated with a task can include identifying a second commitment (C2) that can be created after a first commitment (C1). Identifying a delegation of a commitment where a previous creditor is unknown to a new debtor can include a determination of whether a debtor in C1 is a same and/or similar creditor in C2 and whether consequents in C1 and C2 are the same. Identifying a delegation of a commitment where a previous creditor is known to the new debtor can include determining whether a creditor in C1 is a creditor in C2 and if consequents in C1 and C2 are the same and/or similar.

Matching consequents of two commitments can include determining whether action verbs in both commitments are the same and/or related as synonyms, hypernyms, and/or hyponyms. When the action verbs are the same and/or related, matching the consequents can include determining whether nouns in both commitments are the same and/or related using a co-reference resolution.

The following Example Process 3 is an example of a process to identify a delegated commitment.

Example Process 3

```
1    C2 ← identify create commitments(sentence);
2    delegation ← False;
3    unknown creditor ← False ;
4    known creditor ← False ;
5    for each C1 ∈ commitment array do
6    |   if debtor ∈ C1 = creditor' ∈ C2 then
7    |   |   unknown creditor ← True ;
8    |   else
9    |   |   if debtor ∈ C1 = creditor' ∈ C2 then
10   |   |   |   known creditor ← True ;
11   |   if action verb ∈ C1 = action verb ∈ C2 then
12   |   |   if nouns ∈ C1 = nouns ∈ C2 then
13   |   |   |   if unknown creditor v known creditor then
14   |   |   |   |   delegation ← True;
```

Identifying a discharged commitment 144 can include identifying a task in a past tense that may signal the discharged commitment. Identifying a discharged commitment 144 can be performed after a delegated commitment is identified 134, after a created commitment is identified 126, and/or after a task is identified 120. Once a task is identified 120, any order of identification of a created, delegated, or discharged commitment may be performed.

Identifying the discharged commitment 144 can include determining if a second task (T2) discharges a first commitment (C1) that has already been created. For example, a first task (T1) can include Kim telling Dorothy that she will check (C1) with a particular travel agency. A second task (T2) can include Kim telling Dorothy that she has checked (T1) with the travel agency. Identifying the discharged commitment 144 can include comparing a subject and an object in T2 with a debtor 148 and a creditor in C1, respectively. For example, in T1, Kim (debtor) told Dorothy (creditor) that she would check (action verb) with the travel agency. In T2, Kim (subject) told Dorothy (object) that she checked (action verb) with the travel agency. Therefore, for example, Kim (debtor) (e.g., 148) can be compared to Kim (subject) and Dorothy (creditor) can be compared to Dorothy (object). In this example, they are the same.

When the subject and object of a second task (T2) is the same as a debtor and creditor in a first task (T1), action verbs in each task can be compared to identify a discharge of a commitment. When the action verb in T2 is in the past tense (VBD) 146, an action verb of T2 can be converted into the action verb's base form to be compared to the action verb in C1. For example, the word checked can be converted to check and compared to the word check in C1. When both are the same, nouns in both tasks can be compared. When both nouns are the same, a commitment can be designated as discharged 152. The processing of the message can continue 150 by repeating an attempt to identify a task. A repeat attempt to identify a task 150 can be due to an error and/or discrepancy in already processed information or an attempt to identify additional tasks and/or commitments in the message.

The following Example Process 4 is an example of a process for identifying a discharge of a commitment.

Example Process 4

```
1   T2 ← extract task(sentence);
2   discharge ← False ;
3   for each C1 ∈ commitment array do
4   |   if (subject ∈ T2 = debtor ∈ C1) ∧ (object ∈ T2 = creditor ∈ C1) then
5   |   |   if (getPOS(action verb ∈ T2) = VBD) ∧
            (getBaseVerb(action verb ∈ T2) is action verb ∈ C1) then
6   |   |   |   if nouns ∈ T2 is nouns ∈ C1 then
7   |   |   |   |   discharge ← True ;
```

In contrast to a discharged commitment, an identification of a canceled commitment can be performed. A commitment can be canceled when a debtor of a commitment terminates the commitment. For example, the sentence "Can you please provide the details about the amounts from prior months by this Friday?" can delegate a commitment to a receiver of the message. The receiver of the message can respond with the sentence "I cannot give you the details by Friday," thereby canceling the commitment. For identifying a canceled commitment, a comparison can be made of a task with commitments that already exist. A determination can be made as to whether there is a relation in a type dependency array where an action verb is associated with a negative word (e.g., not, will not, cannot, etc.).

FIG. 2A illustrates a block diagram of an example of identifying task commitments. A flowchart 260 gives an example of how input 261 of a sentence, "I will develop the conversation tool by June end," is analyzed to identify a created commitment. Output 262 of the example sentence can include "user, develop, tool, conversation, end, June." This output 262 can be broken down into its constituent parts. A "user" 264-1 is a subject of the input sentence 260. A verb of the input sentence 261 is develop 266-1. Identifying a created commitment can include determining whether an action verb (e.g., develop 266-1) depends on a modal verb. Modal verbs 268 can include "will, can, may, must, could should, would, please, request," etc. The action verb, develop 266-1, depends on a modal verb, will 270-1, and shows an example of a created commitment.

FIG. 2B illustrates a block diagram of an example of identifying task delegation. A flowchart 270 gives an example of how identifying a delegation of a commitment can be demonstrated by using an example message 272 containing "User 1 reported User 2 will develop the conversation tool by end of June." The message 272 can be separated into outputs of tasks 274. The task outputs 274 can include "User 1, reported, develop, tool, conversation, June, end" and "User 2, develop, tool conversation, June, end." Outputs of commitments 276 of the task outputs 274 can include "User 1, delegation, develop, tool, conversation, June, end" and "User 2, develop, tool, conversation, June, end."

These outputs (e.g., tasks 274 and commitments 276) can be used in a typed dependency array. User 1 264-2 can be a first subject in the typed dependency array. A word (e.g., reported 278) can be a past tense verb of the first subject (e.g., User 1 264-2). A word (develop 266-2) can be a present tense verb of a second subject (e.g., User 2 280). A present tense verb (e.g., develop 266-2) can be dependent on a modal verb (e.g., will 269-2). A delegation of a task commitment can be identified using the typed dependency array and corresponding word relationships.

FIG. 3 illustrates an example of a display of identified commitments according to the present disclosure. Any example of the display 380 can include a user interface 382. The user interface 382 can include a task on a designated line 384 with any number of data. The task elements on a designated line 384 can include a number of parameters 386 designating a status of a task and/or a status of a commitment. The parameter statuses can include create, delegate, assign, progress, discharge, commitment, among others. A user can modify any number of the data elements and click a SEND icon 388 to input a modification to the data. A user can verify the data elements by clicking the SEND icon 388 without modifying any of the data elements.

Figure 4:
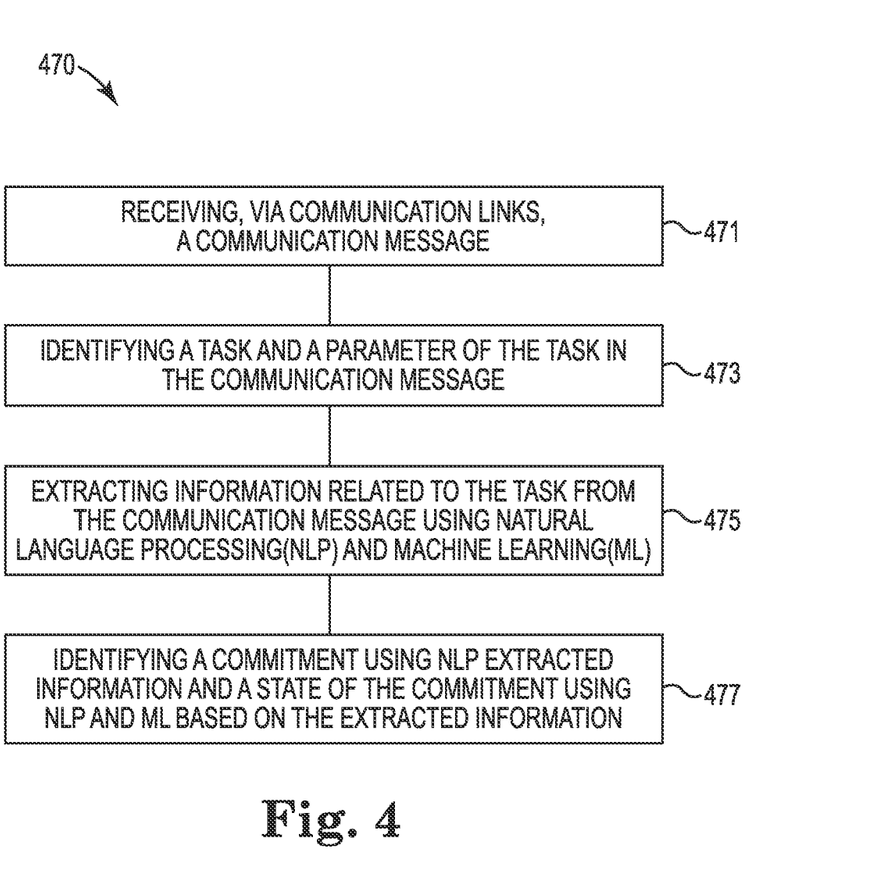
FIG. 4 illustrates a block diagram of an example method for identifying tasks and commitments according to the present disclosure.

FIG. 4 illustrates a block diagram of an example method for identifying tasks and commitments according to the present disclosure. The method 470 can include receiving, via communication links, a communication message (e.g., an email, a memo, a voicemail, a chat message, etc.). The communication message can include a sentence with a task requested of a user (e.g., employee, co-worker, business associate, client, etc.) who is receiving the communication message.

As shown at block 473, the method 470 can include identifying a task and a parameter of the task in the communication message. Identifying a task can include identifying a class of the task in relation to the commitment using machine learning. The task can be a business activity that is predefined (e.g., part of a best practice process) and/or created spontaneously by people in conversation. The task can include a subject, an object, an action, and a deadline. The subject can be a business entity that performs an action. The object can be a business entity for whom an action is being performed by the subject. The action can be a business activity performed by the subject. The action also can be a disjunction or a conjunction of sub-actions. The deadline can represent time-out conditions for an action to be performed. When a time-out occurs, the action can be considered expired.

A parameter can include an owner of a task, a receiver of a task, someone notified of a task, a task deadline, a type of task, a relation to another task, an action related to a task, whether a task furthers a commitment, whether a task ends a commitment, among other parameters.

As shown at block 475, the method 470 can include extracting information related to the task from the communication message using NLP and ML. Extracting information can include extracting task owner information (e.g., who initiated the task, who delegated the task, etc.). NLP can be used to identify if a verb signals a creation of a commitment. NLP can be used to extract information of a task (e.g., a name for a task, users who are involved in a task, a task due date, etc.). NLP-centered approaches for commitment identification can be rule-based. An ML-based approach can complement an NLP-based approach by enabling the learning of complex rules from training data.

As shown at block 477, the method 470 can include identifying a commitment using NLP extracted information and a state of the commitment using NLP and ML extracted information. A ML approach can be used to classify whether a sentence (e.g., including a verb) signals a change in a status of a commitment (e.g., creation, delegation, discharge, cancellation, etc.). The ML approach can complement the NLP approach in identifying a state of a commitment. Information from both NLP and ML phases can be used to determine related parameters associated with a task and the lifecycle of a commitment, respectively. For example, a commitment that has been completed can be changed from a designated state of pending to a designated state of completed (e.g., a change in a commitment lifecycle).

Figure 5:
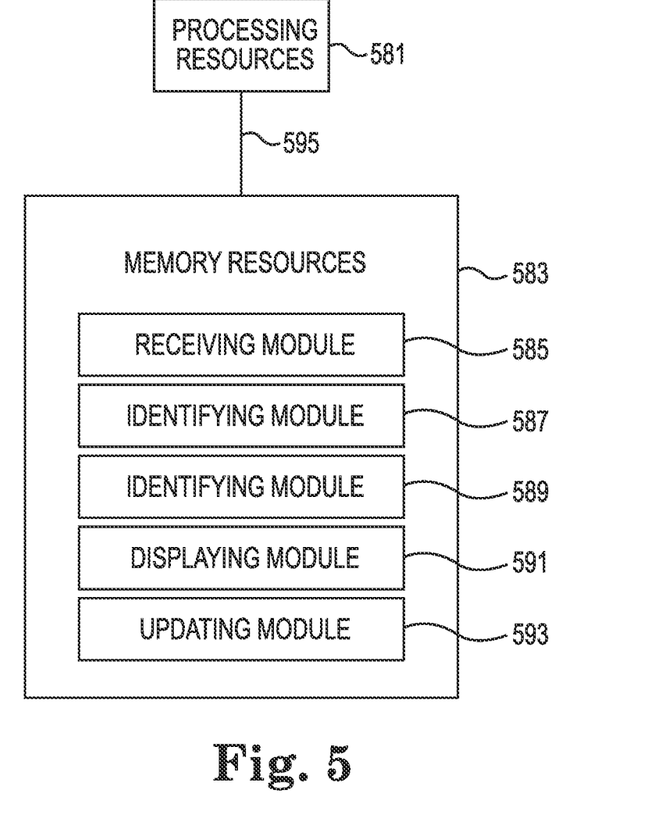
FIG. 5 illustrates a block diagram of an example of processing resources and memory resources for identifying tasks and commitments according to the present disclosure.

FIG. 5 illustrates a block diagram of an example of processing resources 581 and memory resources 583 for identifying tasks and commitments according to the present disclosure. The processing resources 581 and memory resources 583 can be local to a computing network, such as on a router. The memory resources 583 (e.g., a tangible, non-transitory medium) can store a set of program instructions (e.g., software, firmware, etc.) executable by the processing resource 581. Memory resources 583 may be integrated in a single device or distributed across multiple devices. The memory resources 583 may be fully or partially integrated in the same device as processing resources 581 or the memory resources 583 can be separate but accessible to the processing resources 581 (e.g., via a communication path 595). The memory resources 583 can be local to a router or remote therefrom. For those examples in which the memory resources 583 are remote from the router, the instructions can be loaded into the memory resources of the router.

Memory resources 583 can be in communication with a number of processing resources of less than, the same, or more than 581. The processing resources 581 can be in communication with tangible non-transitory memory resources 583 storing a set of machine-readable instructions (MRI) executable by one or more of the processing resources 581, as described herein. The MRI can include a number of modules 585, 587, 589, 591, and 593. The MRI can also be stored in remote memory and represent an installation package that can be downloaded, installed, and executed.

Processing resources 581 can execute MRI that can be stored on internal or external non-transitory memory resources 583. The processing resources 581 can execute MRI to perform various functions, including the functions described with regard to FIGS. 1-4. For example, the processing resources 581 can execute MRI to implement identifying a task and/or commitments as described with regard to FIGS. 1-4.

The number of modules 585, 587, 589, 591, and 593 can include MRI that, when executed by the processing resources 581, can perform a number of functions. A number of the modules 585, 587, 589, 591, and 593 can be sub-modules of other modules. For example, a receiving module 585 and an identifying module 587 can be sub-modules and/or contained within the receiving module 585. In another example, the modules 585, 587, 589, 591, and 593 can be individual modules on separate and distinct computing devices. A receiving module 585 can include MRI that when executed by the processing resources 581 can receive, via communication links, a communication message. The communication message can, for example, be an email, a memo, a voicemail, a chat message, among other means of communication.

An identifying module 587 can include MRI that when executed by the processing resources 581 can identify a task in the communication message based on pronoun resolution, name entity resolution (NER), and extraction of part-of-speech tags and typed dependencies from the communication message. Pronoun resolution, NER and extraction of part-of-speech tags can be performed by a natural language parser.

An identifying module 589 can include MRI that when executed by the processing resources 581 can identify a parameter of the task based on the pronoun resolution, NER, and the part-of-speech tags extraction information. A parameter of a task can include a commitment to perform the task by a user. A parameter of a task can include a delegation of the commitment to another user. A parameter of a task can include a discharge of the commitment. Updating a displayed task and a parameter can include identifying a commitment of a task. Updating a displayed task and a parameter can include updating an already identified commitment.

A displaying module 591 can include MRI that when executed by the processing resources 581 can display the identified task and the identified parameter on a user interface. The display of the identified task can be manipulated by the user interface. The display of the identified parameter can be manipulated by the user interface. A display can be verified by a user through the user interface.

An updating module 593 can include MRI that when executed by the processing resources 581 can update the displayed task and the parameter based on user input. An update can be based on a change in a lifecycle of the task.

Non-transitory memory resources 583, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, as well as other types of computer-readable media.

The non-transitory memory resources 583 can be integral, or communicatively coupled, to a computing device, in a wired and/or a wireless manner. For example, the non-transitory memory resource 583 can be an internal memory, a portable memory, a portable disk, or a memory associated with another computing resource (e.g., enabling MRIs to be transferred and/or executed across a network).

The memory resources 583 can be in communication with the processing resources 581 via the communication path 595. The communication path 595 can be local or remote to a machine (e.g., a computer) associated with the processing resources 581. Examples of a local communication path 595 can include an electronic bus internal to a machine (e.g., a computer) where the memory resource 583 is one of volatile, non-volatile, fixed, and/or removable storage medium in communication with the processing resources 581 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 595 can be such that the memory resources 583 are remote from the processing resources 581 such as in a network connection between the memory resources 583 and the processing resources 581. That is, the communication path 595 can be a network connection. Examples of such a network connection can include a local area network (LAN), wide area network (WAN), personal area network (PAN), and the Internet, among others. In such examples, the memory resources 583 can be associated with a first computing device and the processing resources 581 can be associated with a second computing device (e.g., a Java® server). For example, processing resources 581 can be in communication with memory resources 583, wherein the memory resources 583 include a set of instructions and wherein the processing resources 581 are designed to carry out the set of instructions.

The processing resources 581 coupled to the memory resources 583 can execute MRI to receive a communication message. The processing resources 581 coupled to the memory resources 583 can also execute MRI to identify a task and/or commitment in the communication message based on pronoun resolution, NER, and extraction of part-of-speech tags and typed dependencies from the communication message. The processing resources 581 coupled to the memory resources 583 can also execute MRI to identify a parameter of the task based on the pronoun resolution, NER, and the part-of-speech tags extraction information. The processing resources 581 coupled to the memory resources 583 can also execute MRI to display the identified task and the identified parameter on a user interface. The processing resources 581 coupled to the memory resources 583 can also execute MRI to update the displayed task and/or the parameter based on user input.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A computer-implemented method for identifying tasks and commitments, comprising:
   receiving, via communication links, a communication message;
   identifying a task and a parameter of the task in the communication message;
   extracting information related to the task from the communication message using natural language processing (NLP) and machine learning (ML);
   identifying a commitment using NLP extracted information and a state of the commitment using NLP and ML based on the extracted information;
   receiving an additional communication message associated with the identified task; and
   updating the state of the commitment based on information extracted from the received additional communication message.

2. The method of claim 1, wherein extracting the information related to the task comprises extracting task owner information.

3. The method of claim 1, comprising identifying a delegation of the commitment from one debtor to another.

4. The method of claim 1, comprising identifying a discharge of the commitment.

5. The method of claim 1, comprising identifying a class of the task in relation to the commitment using ML.

6. A computing system for identifying tasks and commitments comprising:
   a memory resource;
   a processing resource coupled to the memory resource to:
      receive, via communication links, a communication message;
      perform pronoun resolution and name entity resolution on information within the communication message;
      extract part-of-speech tags and typed dependencies from the communication message using machine learning;
      identify a task in the communication message based on the resolution and the extraction information;
      identify a parameter of the task based on the resolution and the extraction information, wherein the parameter comprises at least one of:
         a commitment to perform the task by either of a user sending the communication message and a user receiving the communication message;
         a delegation of the commitment from one user to another user;
         a discharge of the commitment; and
         a class of the task in relation to the commitment using machine learning; and
      display the identified task and parameter on a user platform.

7. The system of claim 6, comprising the processing resource coupled to the memory resource to identify a task by determination of whether there is a valid subject and a valid action verb in a sentence of the communication message and association of nouns with the valid action verb based on a dependency list.

8. The system of claim 6, wherein the commitment to perform the task is identified when an action verb associated with the identified task follows a modal verb in the communication message.

9. The system of claim 6, wherein the delegation of the commitment is identified by designation of a first user that was a debtor as a creditor and designation of a second user as a new debtor responsible for the commitment.

10. The system of claim 6, wherein the discharge of the commitment is identified by comparison of words in a first communication message associated with a first task that signals the commitment to words in a second communication message of a second task and determination of the commitment as discharged by the second task when:
    the first and second tasks have a same user to perform the first and second tasks;
    an action verb in the second communication message of the second task is past tense and action verbs in the first and second communication messages associated with the first and second tasks are related; and
    nouns that correspond to the action verbs in the first and second communication messages associated with the first and second tasks are similar.

11. A non-transitory machine-readable medium storing a set of instructions for identifying tasks and commitments, wherein the set of instructions is executable by a processor to cause a computer to:
    receive, via communication links, a communication message;
    identify a task in the communication message based on pronoun resolution, name entity resolution (NER), and extraction of part-of-speech tags and typed dependencies from the communication message using machine learning;
    identify a parameter of the task based on the pronoun and NER and the part-of-speech tags extraction information;
    display the identified task and the identified parameter on a user interface; and
    update the displayed task and the parameter based on user input.

12. The medium of claim 11, comprising to update the parameter of the task based on a change in a lifecycle of the task.

13. The medium of claim 11, wherein the parameter of the task comprises at least one of:
    a commitment to perform the task by a user;
    a delegation of the commitment; and
    a discharge of the commitment.

14. The medium of claim 11, wherein to update the displayed task and the parameter comprises at least one of identifying whether a task indicates a commitment and updating an already identified commitment.

15. The medium of claim 11, wherein the pronoun resolution, NER, and extraction of part-of-speech tags are performed by a natural language parser.

* * * * *